April 2, 1968   E. E. MATTHEWS   3,375,601
FISHING GAFF
Filed Aug. 9, 1965
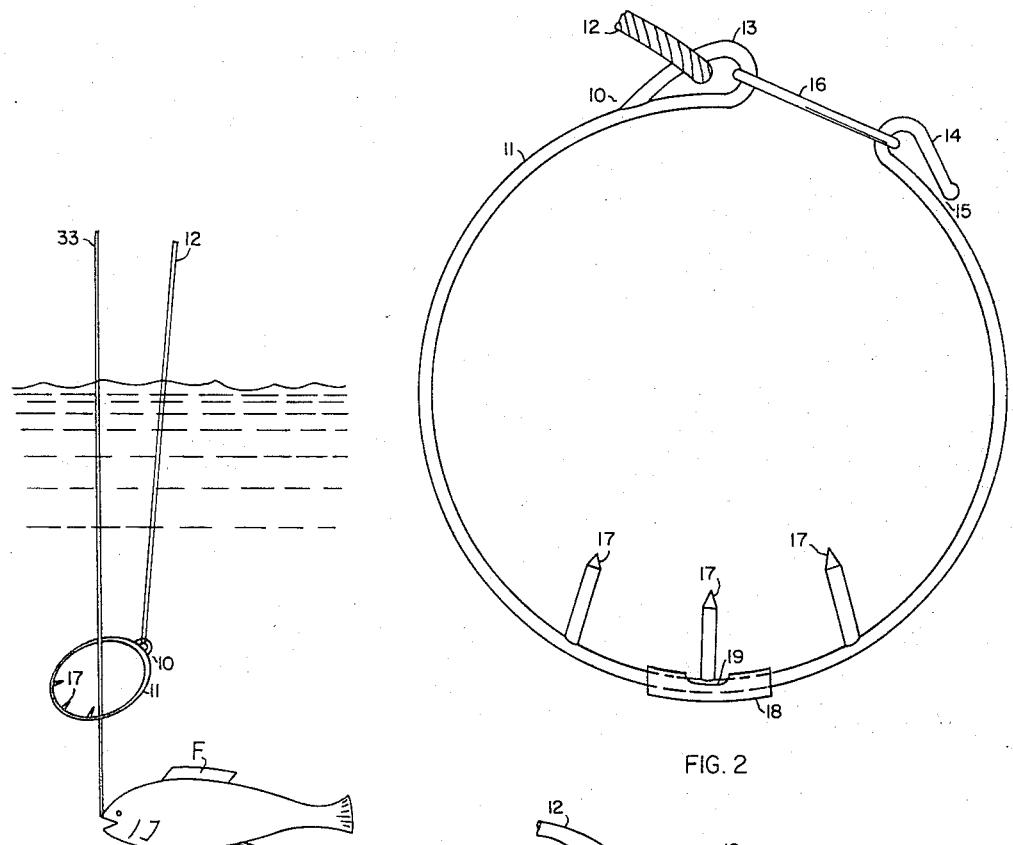
FIG. 1
FIG. 2
FIG. 3
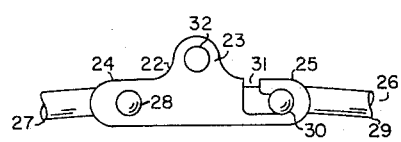
FIG. 5
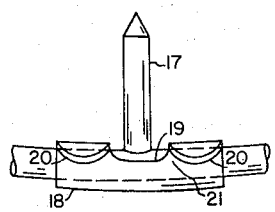
FIG. 4
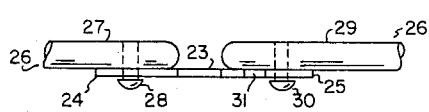
FIG. 6
EDWARD E. MATTHEWS
INVENTOR
BY *John C. Stahl*
ATTORNEY

United States Patent Office 3,375,601
Patented Apr. 2, 1968

3,375,601
FISHING GAFF
Edward E. Matthews, South Houston, Tex.
(Rte. 1, Box 267, McAllen, Tex. 78501)
Filed Aug. 9, 1965, Ser. No. 478,055
3 Claims. (Cl. 43—5)

ABSTRACT OF THE DISCLOSURE

A fishing gaff comprising a ring having spaced free ends, a link member is provided to close the space between the free ends of the ring, a plurality of spaced and inwardly extending tines on the ring, the ring and the tines lying in a common plane, and a line is secured to the ring and the ring is passed around a fishing line and lowered to engage the tines with a fish caught on the fishing line.

---

The present invention relates to a fishing gaff and more particularly to a split ring fishing gaff which is to be placed on a fishing line and slidably lowered on said line to engage a fish caught thereon for landing the same.

Prior to the subject invention, fish landing devices and nets have been utilized in connection with a fishing line to aid in landing fish. Although such devices have served the purpose, they have not proved entirely satisfactory under all conditions of service for the reason that considerable difficulty has been experienced in the tangling of such devices, or parts thereof, in the fishing line.

An object of the present invention is the provision of a fishing gaff which does not become entangled in or damage the fishing line during use.

Another object is to provide a light weight fishing gaff with a minimum number of working parts.

A further object of the invention is the provision of a fishing gaff which is simple in construction, inexpensive to manufacture, capable of mass production techniques, and extremely easy to use and maintain in serviceable condition.

Other objects and features of the invention will become apparent to those skilled in the art as the disclosure is made in the following detailed description of preferred embodiments of the invention as illustrated in the accompanying sheet of drawing in which:

FIG. 1 is a side elevational view illustrating the fishing gaff of the subject invention associated with a fishing line and a fish engaged on the said fishing line.

FIG. 2 is a top plan view of the fishing gaff of the subject invention.

FIG. 3 is a fragmentary, end view of the closing means utilized in connection with the embodiment of FIG. 2.

FIG. 4 is a slightly enlarged, top plan view showing a detachable weight which may be utilized in connection with the invention.

FIG. 5 is a fragmentary, top plan view of a modification of the invention.

FIG. 6 is an end view of FIG. 5.

Referring now to the drawings, wherein like reference characters designate like or corresponding parts throughout the several views, there is shown in FIG. 1 a fishing gaff, indicated generally by 10, consisting of a split ring or band 11 to which is attached an elongated rope or line 12, preferably of nylon or the like. As best seen in FIG. 2, one end of the split ring 11 includes an integrally formed, closed loop 13 the longitudinal axis of which is parallel to the longitudinal plane of ring 11 (see FIG. 3); the opposite end of said ring includes an integrally formed hook 14 which is slightly spaced from loop 13. The longitudinal axis of hook 14 is parallel to the longitudinal plane of ring 11, the said hook opens outwardly and further includes a restricted portion, indicated generally at 15. It is evident that the ring 11, loop 13, and hook 14 are in a common plane. Ring 11 is preferably constructed of stainless steel, aluminum alloy, bronze or other rust-resistant material, and may vary from six to thirty-six inches in diameter.

A link 16, preferably of rust-resistant material, is passed through loop 13; when the ring 11 is slightly compressed the free end of link 16 may be passed over the outermost end of hook 14 and when such compressive force is released, the said link passes through the restricted portion 15 into the hook 14, thereby closing the split ring. The link 16 may be removed from hook 14 by reversing such steps. One end of line 12, heretofore mentioned, may be passed through loop 13 and spliced or otherwise secured thereto.

A plurality of spaced, inwardly extending tines 17 are secured as by welding to the said ring 11; the longitudinal axis of each such tine is in a common plane with ring 11 and as viewed in plan, each tine is angled in such a manner that the longitudinal axes of the said tines, when extended, intersect in the loop 13.

If required, additional weight may be detachably secured to the ring 11; as best seen in FIG. 4, a shaped weight 18 includes a cut-out 19 of sufficient width to accommodate a selected tine and laterally extending tabs 20 on each side of said cut-out. After the weight is wrapped around the ring, the tabs 20 may be pressed downwardly over the terminal portion 21 of the said weight, securing the weight in such position.

There is shown in FIGS. 5 and 6 of the drawings a modification of the invention consisting of a flat, inverted T-shaped securing device 22 including an upstanding lug 23 and laterally extending arms 24–25, which securing device is to be used in combination with a split ring 26. More specifically, arm 24 is pivotally connected to one side of ring 26 in proximity to end 27 thereof as by means of rivet 28 or the like; the corresponding side of the opposite end 29 of ring 26 includes a horizontally outward extending pin 30 or the like. Arm 25 of device 22 includes an L-shaped recess 31 into which pin 30 may insert when the ends 27, 29 of ring 26 are drawn together and secured in such recess when the said ends are released. The lug 23 of securing device 22 includes a transverse bore 32 through which a line or rope, corresponding to line 12, may be passed and secured in a conventional manner.

In operation, after a fish F is caught, as illustrated in FIG. 1 of the drawings, the split ring 11 or 26 of the subject invention is opened and placed around the fishing line 33, after which link 16 or securing device 22 is secured in the manner heretofore described. The fishing line 33 guides the ring downwardly toward the fish; after the ring passes over the head of the fish the fisherman may pull upon line 12 whereby the tines 17 insert into the fish's body. The fish may then be raised to the boat, bridge, wharf, or the like by the fisherman by means of the line 12.

It should be understood, of course, that the foregoing disclosure relates to only preferred embodiments of the invention and that numerous modifications or alterations may be made therein without departing from the spirit and scope of the invention as set forth in the appended claims.

What is claimed is:
1. A fishing gaff comprising
    a ring member having spaced free ends,
    a loop on one free end of said ring member,
    a hook on the other free end of said ring member,
    a plurality of spaced tines secured to said ring member and extending into the ring,
    said ring member, loop, hook and tines lying in a common plane, a link pivotally secured to said loop and detachably connected to said hook to close the space between said free ends of said ring member, and a line secured to said loop.

2. A fishing gaff comprising a ring member having spaced free ends, an integrally formed loop on one free end of said ring member, an integrally formed hook on the other free end of said ring member, a plurality of spaced tines secured to said ring member and extending into the ring, said ring member, loop, hook and tines lying in a common plane, a link pivotally secured to said loop and detachably connected to said hook to close the space between said free ends of said ring member, and a line secured to said loop.

3. A fishing gaff comprising a ring member having spaced free ends, a loop on one free end of said ring member, a hook on the other free end of said ring member, a plurality of spaced tines secured to said ring member and extending into the ring, said ring member, loop, hook and tines lying in a common plane, a link pivotally secured to said loop and detachably connected to said hook to close the space between said free ends of said ring member, a line secured to said loop, and a weight detachably connected to said ring member in proximity to said tines.

References Cited

UNITED STATES PATENTS

| 3,296,730 | 1/1967 | Leverdingen | 43—17.2 |
| 3,172,225 | 3/1965 | Zoss | 43—17.2 |

FOREIGN PATENTS

| 1,326,907 | 4/1963 | France. |
| 539,246 | 2/1956 | Italy. |

SAMUEL KOREN, *Primary Examiner.*

WARNER H. CAMP, *Examiner.*